United States Patent
Birk et al.

(10) Patent No.: US 6,942,251 B2
(45) Date of Patent: Sep. 13, 2005

(54) ACTUATING DEVICE FOR A SAFETY MEANS

(75) Inventors: Karl Birk, Ebersbach (DE); Uwe Class, Schechingen (DE); Reiner Dannenhauer, Welzheim (DE); Michael Lüders, Schechingen (DE); Thomas Miodek, Mutlangen (DE); Thomas Hasbach, Köln (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 147 days.

(21) Appl. No.: 10/162,969

(22) Filed: Jun. 5, 2002

(65) Prior Publication Data

US 2002/0190515 A1 Dec. 19, 2002

(30) Foreign Application Priority Data

Jun. 18, 2001 (DE) ................................. 201 10 046 U
Sep. 28, 2001 (DE) ...................................... 101 47 970

(51) Int. Cl.$^7$ ..................... B60R 22/195; B60R 22/46
(52) U.S. Cl. ............................... 280/806; 297/480
(58) Field of Search ........................ 280/806; 297/480

(56) References Cited

U.S. PATENT DOCUMENTS

| | | | | |
|---|---|---|---|---|
| 2,483,088 A | | 9/1949 | De Haven ................. 254/93 R |
| 2,880,815 A | * | 4/1959 | Apfelbaum ................. 280/805 |
| 3,292,744 A | * | 12/1966 | Replogle .................... 280/806 |
| 3,386,683 A | * | 6/1968 | Howland .................... 297/480 |
| 3,838,746 A | * | 10/1974 | Andres ........................ 280/806 |
| 3,871,470 A | * | 3/1975 | Schwanz et al. ............ 280/806 |
| 3,901,531 A | * | 8/1975 | Prochazka ................... 297/480 |
| 3,942,819 A | * | 3/1976 | Schwanz et al. ............ 297/480 |
| 4,006,934 A | * | 2/1977 | Murakami et al. .......... 297/480 |
| 4,008,909 A | * | 2/1977 | Otani et al. ................. 297/480 |
| 4,015,860 A | * | 4/1977 | Tisell et al. ................. 280/806 |
| 4,767,161 A | * | 8/1988 | Sedlmayr et al. ........... 280/806 |
| 5,186,494 A | * | 2/1993 | Shimose ..................... 280/806 |
| 5,322,322 A | * | 6/1994 | Bark et al. ............... 280/730.2 |
| 5,451,094 A | * | 9/1995 | Templin et al. ............. 297/480 |
| 5,464,246 A | * | 11/1995 | Castro et al. ............ 280/730.2 |
| 5,492,368 A | * | 2/1996 | Pywell et al. ............... 280/806 |
| 5,897,135 A | | 4/1999 | Oehm |
| 5,924,722 A | * | 7/1999 | Koide et al. ................ 280/806 |
| 5,971,491 A | * | 10/1999 | Fourrey et al. ............. 280/806 |
| 6,152,481 A | * | 11/2000 | Webber et al. .......... 280/730.2 |
| 6,322,140 B1 | * | 11/2001 | Jessup et al. ............... 297/480 |
| 6,336,653 B1 | * | 1/2002 | Yaniv et al. ............. 280/730.1 |
| 6,447,011 B1 | * | 9/2002 | Vollimer .................... 280/806 |
| 6,565,121 B2 | * | 5/2003 | Knych et al. ............... 280/806 |
| 2003/0137140 A1 | * | 7/2003 | Lutz et al. .................. 280/806 |
| 2003/0155801 A1 | * | 8/2003 | Tatematsu et al. .......... 297/480 |

FOREIGN PATENT DOCUMENTS

| | | |
|---|---|---|
| DE | 2543068 | 4/1976 |
| DE | 4308571 | 9/1994 |
| DE | 19531097 | 2/1997 |
| DE | 19724628 A1 | 1/1998 |
| DE | 19750182 A1 | 5/1999 |
| DE | 19935737 A1 * | 2/2001 |
| DE | 10045328 B1 * | 5/2001 |
| DE | 10058932 B1 * | 5/2001 |
| DE | 19956304 A1 | 5/2001 |
| DE | 10065464 | 8/2001 |
| DE | 20106056 U1 | 9/2001 |
| DE | 10100876 C1 | 4/2002 |
| EP | 0751304 A2 | 1/1997 |
| EP | 0924122 | 6/1999 |
| EP | 1110808 | 6/2001 |
| EP | 1371518 A1 * | 12/2003 |

(Continued)

*Primary Examiner*—Darren W. Ark
(74) *Attorney, Agent, or Firm*—Tarolli, Sundheim, Covell & Tummino L.L.P.

(57) ABSTRACT

An actuating device for a safety arrangement in a vehicle has a pneumatic muscle as drive and a pyrotechnical gas generator for feeding the pneumatic muscle.

3 Claims, 11 Drawing Sheets

FOREIGN PATENT DOCUMENTS

| | | |
|---|---|---|
| FR | 2442058 | 11/1978 |
| JP | 2001-247010 B1 * | 9/2001 |
| JP | 2001-287622 B1 * | 10/2001 |
| JP | 2004-106651 A1 * | 4/2004 |
| WO | WO-96/21585 A1 * | 7/1996 |
| WO | WO 01/14172 | 3/2001 |

* cited by examiner

ACTUATING DEVICE FOR A SAFETY MEANS

TECHNICAL FIELD

This invention relates to an actuating device for a safety means in a vehicle, and an assembly consisting of a safety means and such actuating device.

BACKGROUND OF THE INVENTION

Such actuating devices have so far been designed as compressed-gas-operated piston-cylinder units or electric drives. Piston-cylinder drives are inflexible and mostly bulky, as they must have a linear travel path for the piston. An important prerequisite for the use for a safety means is the reaction time, i.e. how fast can the actuating device activate the protection means to such an extent that the protective effect is obtained. This is impeded by the mass inertia of moving parts. It is often attempted to compensate this obstacle by overdimensioning the drive, whereby space requirement and weight of the actuating device are increased.

The invention provides an actuating device requiring little space, which can flexibly be accommodated in the vehicle and has a very short reaction time.

BRIEF SUMMARY OF THE INVENTION

According to the invention, an actuating device is provided which has a pneumatic muscle as drive and a pyrotechnical gas generator for feeding the pneumatic muscle. Pneumatic muscle is understood here to be a fluid-operated actuating device, as it is described for instance in DE 195 31 097 A1. The pneumatic muscle consists of a tubular body, which is surrounded by a sleeve with a net-like structure. When the tubular body is pressurized, this leads to a radial expansion, which due to the net structure of the sleeve results in a longitudinal contraction of the muscle. In the case of activation, an actuating device with such pneumatic muscle can react very quickly, because in contrast to a piston-cylinder drive no piston mass has to be accelerated. Since the pyrotechnical gas generator can produce a sufficient amount of gas with the required pressure within fractions of a second, the safety means can be activated very quickly by the actuating device, so that in the case of an accident the protective effect can be produced in good time and effectively. In addition, the pneumatic muscle is flexible, so that the actuating device in the vehicle can be bent during installation and thus be mounted even at hardly accessible points and can also be laid in curved fashion.

Further advantageous aspects of the invention can be taken from the sub-claims.

DETAILED DESCRIPTION OF THE PREFERRED EMBODIMENTS

Figure 1A:
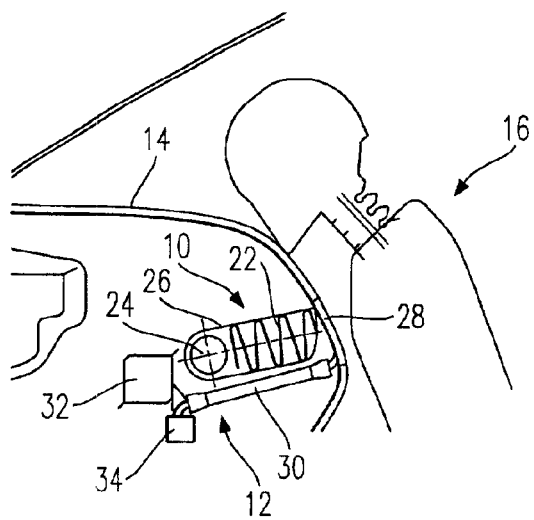
FIGS. 1a to 1e show a schematic cross-section through a first embodiment of an assembly according to the invention, in successive phases of an activation process, respectively.
Figure 1B:
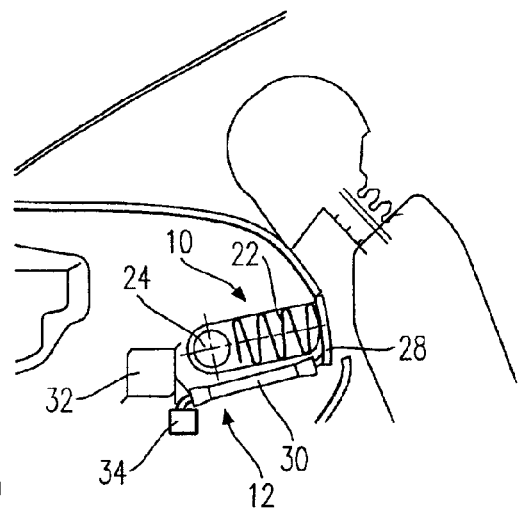
Figure 1C:
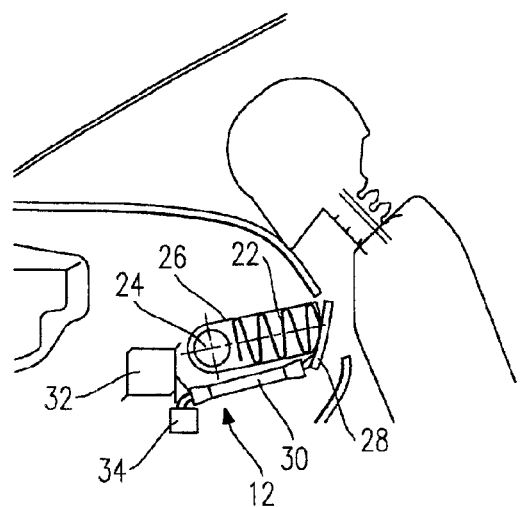
Figure 1D:
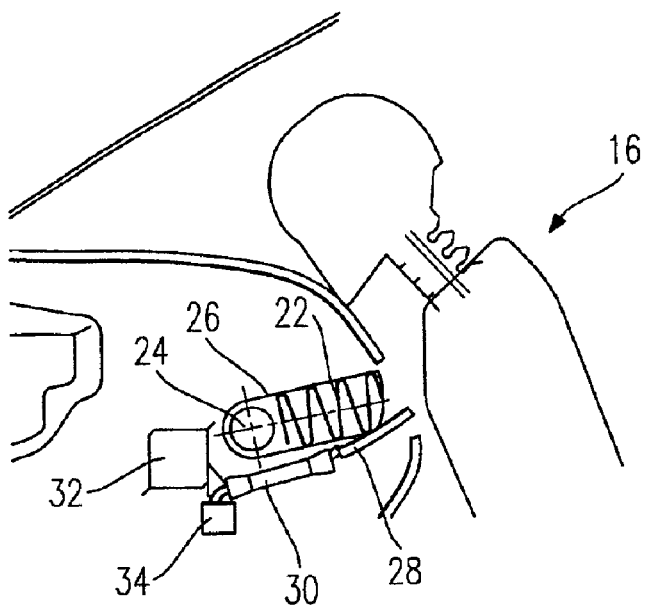
Figure 1E:
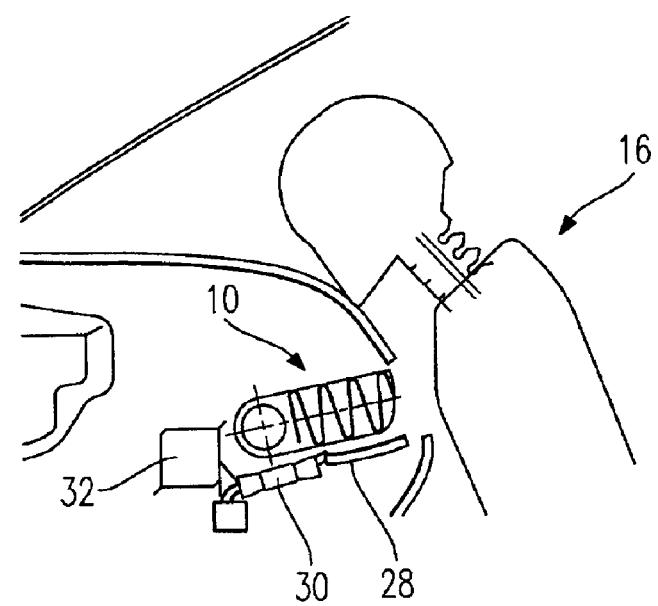

In FIGS. 1a to 1e there is to be seen an assembly according to the invention, comprising a safety means 10 and an actuating device 12, in successive phases of activation of the safety means 10. The assembly is incorporated in a dashboard 14 of a vehicle. In the Figures, the contours of the upper torso of a vehicle occupant 16 are represented schematically, which torso is bent forwards towards the dashboard 14. In the represented embodiment, the safety means 10 consists of a gas bag module with a folded gas bag 22 and a main gas generator 24, which are accommodated in a housing 26. The housing 26 has an opening which points towards the vehicle occupant 16 and is closed by a covering flap 28. In this arrangement, the covering flap 28 may exist in various designs, for instance integrated in the dashboard 14 as shown in the Figures, mounted on the dashboard as a separate cover, or as a component of the housing 26.

The actuating device 12 has a pneumatic muscle 30, one end of which may be attached to the covering flap 28 and the other end of which may for instance be attached to a frame member 32 of the vehicle or to the housing 26 of the gas bag module. A secondary gas generator 34 advantageously is disposed in the vicinity of the pneumatic muscle 30 and is in flow connection with the same.

For activating the safety means, the secondary gas generator 34 is ignited first of all, which in shortest time generates a gas volume that gets into the pneumatic muscle 30 and effects a longitudinal contraction of the same. Due to the longitudinal contraction of the pneumatic muscle 30, the covering flap 28 is drawn into the interior of the dashboard 14 (FIGS. 1b to 1e), in so doing it clearing the opening of the housing 26.

Subsequently, the main gas generator 24 can be ignited in order to inflate the gas bag 22. Since the opening of the housing 26 has now been cleared, less amount of gas is required for inflating the gas bag 22 than with comparable gas bag modules in which a covering flap must first be opened by the pressure of the deploying gas bag. As a result, the main gas generator 24 can be designed much smaller and lighter.

Figure 2:
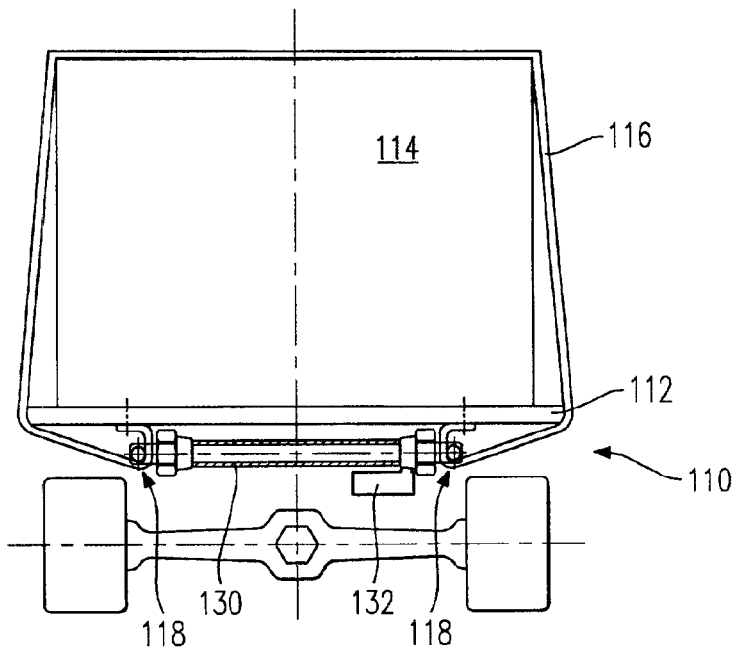
FIG. 2 shows a schematic cross-section through a vehicle with an assembly according to a second embodiment of the invention in the non-activated condition of the assembly.
Figure 3:
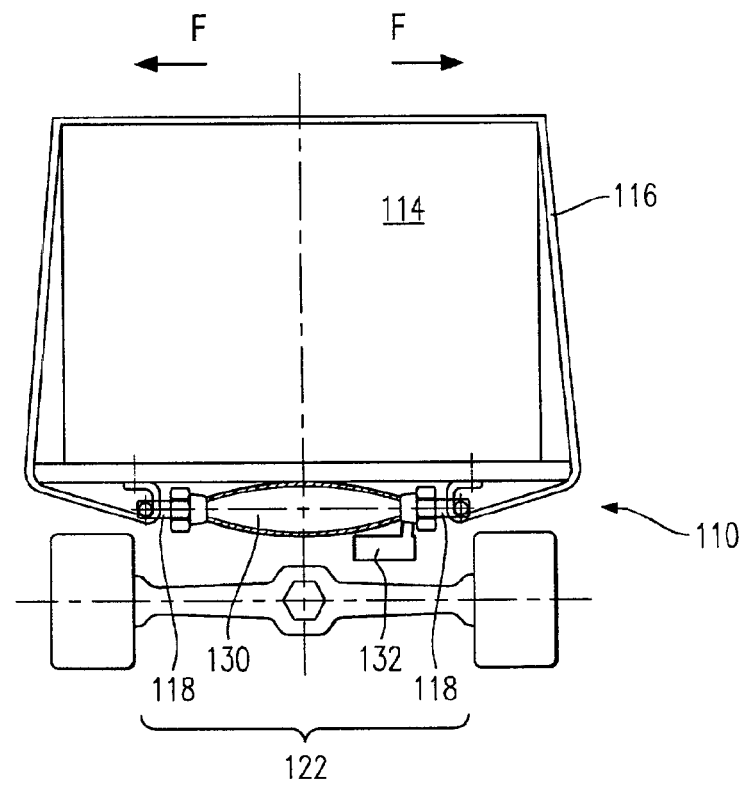
FIG. 3 shows a schematic cross-section through the vehicle of FIG. 2 in the activated condition of the assembly.

A second embodiment of the assembly according to the invention can be seen in FIGS. 2 and 3. On a schematically represented truck 110 with a loading area 112 a cargo 114 is disposed, which is secured with a tensioning belt 116. The two ends of the tensioning belt 116 are attached to the loading area 112 on the lower side thereof and are each passed through one of two eyes 118 of a tensioning device. For tensioning the tensioning belt 116, the two eyes 118 are movable parallel to the plane of the loading area 112. The tensioning device can be actuated by an actuating device 122 comprised of a pneumatic muscle 130 and a pyrotechnical gas generator 132. For this purpose, the ends of the pneumatic muscle 130 are each connected with one of the eyes 118. For activating the tensioning device, the pneumatic muscle 130 is pressurized so that it contracts in the known manner, thereby moving the eyes 118 towards each other such that the tensioning belt 116 is tensioned.

An additional mechanical lock can prevent that upon decrease in pressure in the pneumatic muscle 130 the tensioning device slackens again.

In the case of accidents or emergency stops, the tensioning device can for instance be activated by a sensor. In this way it can be prevented that the cargo 114 on the loading area 112 slips away.

It may, however, also be provided to actuate the tensioning device automatically or by manual activation at the end of the loading operation. The advantage is that when manually securing the cargo, less force must be applied. When the pressure existing in the pneumatic muscle during the tensioning operation is measured, the measured pressure value can be used as a criterion as to whether the cargo is secured sufficiently.

In general, a possibly existing compressed-air generator of the vehicle may also be utilized as pressure source for the pneumatic muscle, whereas the gas generator 132 is only ignited in the case of accidents or emergency stops.

The safety means described is suitable for instance for trucks and trailers, but also for railway vehicles.

Figure 4:
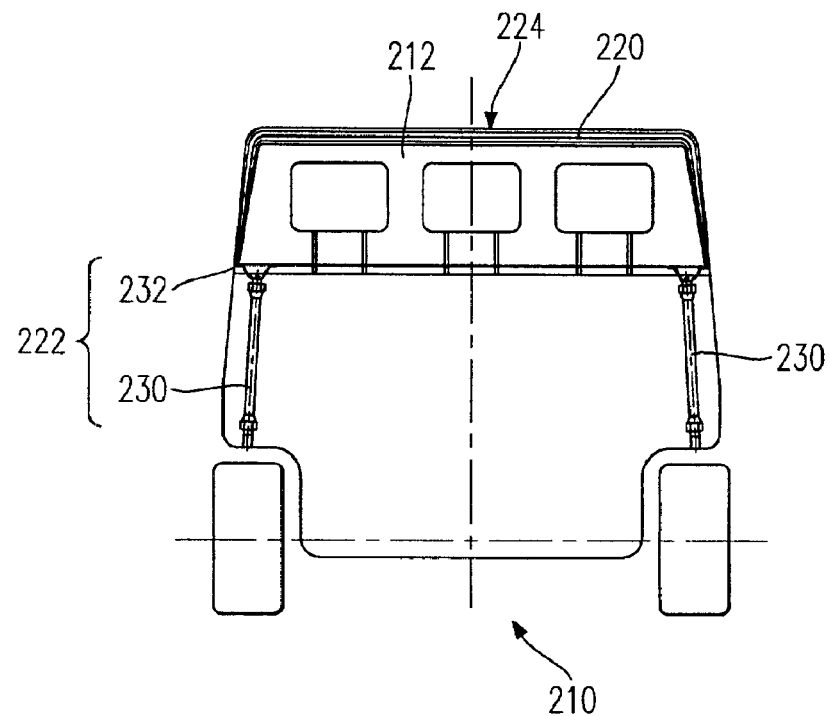
FIG. 4 shows a schematic cross-section through a vehicle with an assembly according to a third embodiment of the invention in the non-activated condition of the assembly.
Figure 5:
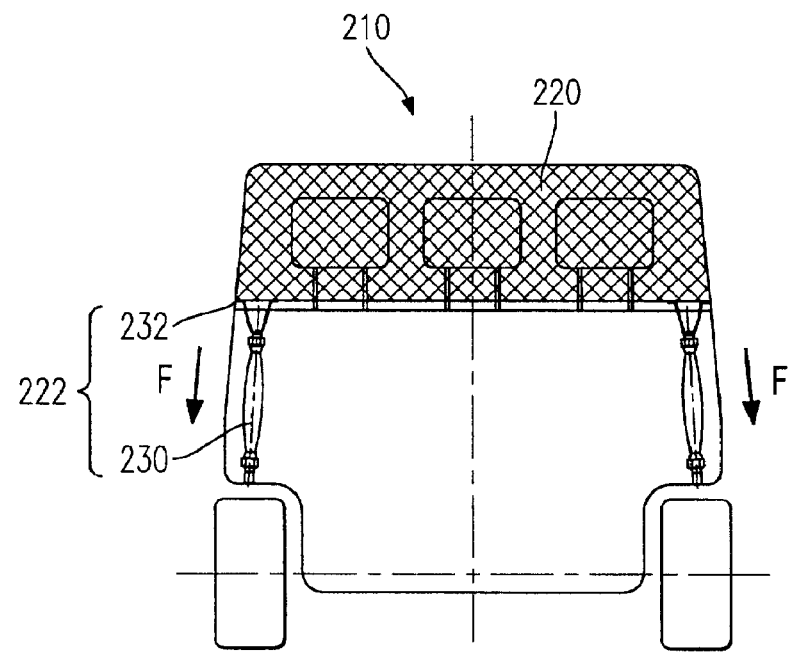
FIG. 5 shows a schematic cross-section through the vehicle of FIG. 4 in the activated condition of the assembly.

Another embodiment of an assembly according to the invention can be seen in FIGS. 4 and 5. In a schematically represented vehicle 210, for instance a station wagon with a loading area behind the seats, a retaining net 220 is disposed between a passenger compartment 212, which is illustrated in the Figures by the indicated headrests, and the loading area, which retaining net in the non-used condition is accommodated at the vehicle roof 224, for instance hidden under the roof liner. The retaining net 220 is connected with an actuating device 222, which consists of two pneumatic muscles 230, which are fed from one common gas generator or each from separate gas generators (not shown). One end of each of the pneumatic muscles 230 is attached to the vehicle body. With the respective other end the pneumatic muscles 230 can exert a tensile force on the retaining net 220 via a traction device, for instance a traction cable 232. Upon activation of the actuating device 222, the pneumatic muscles 230 undergo a longitudinal contraction (FIG. 5) by means of compressed gas from the gas generator. As a result, the retaining net 220 is pulled down from its unused condition from the vehicle roof by the traction cables 232 and is spread out, so that it separates the loading space from the passenger compartment 212 and thus prevents a slipping of cargo out of the loading space.

As a variant, the retaining net 220 can already be spread out between the passenger compartment 212 and the loading space before activating the actuating device, so that it is tensioned upon activating the actuating device 222, in order to increase the protective effect against slipping cargo.

Figure 6:
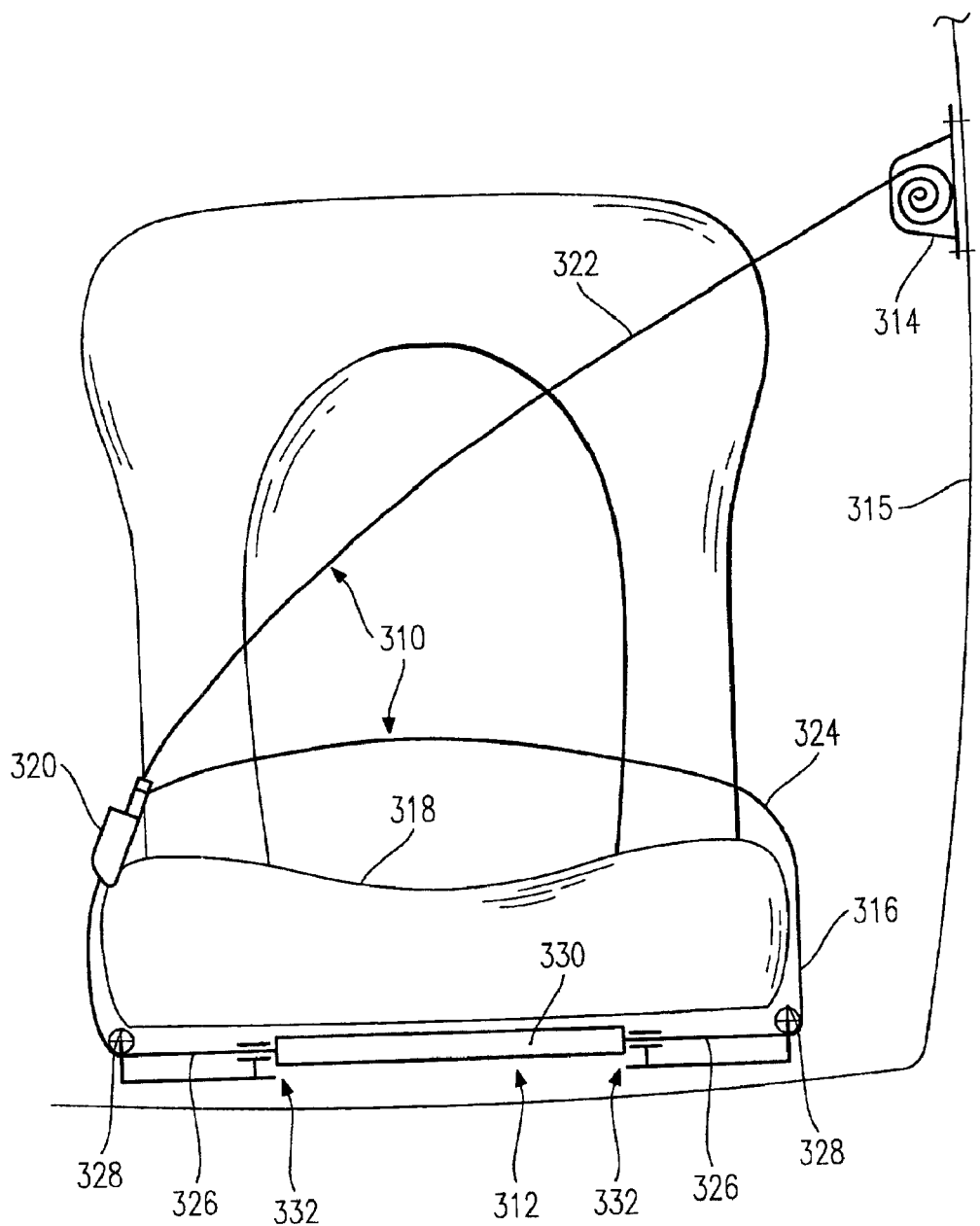
FIG. 6 shows a schematic cross-section through an assembly according to a fourth embodiment of the invention in the non-activated condition of the assembly.
Figure 7:
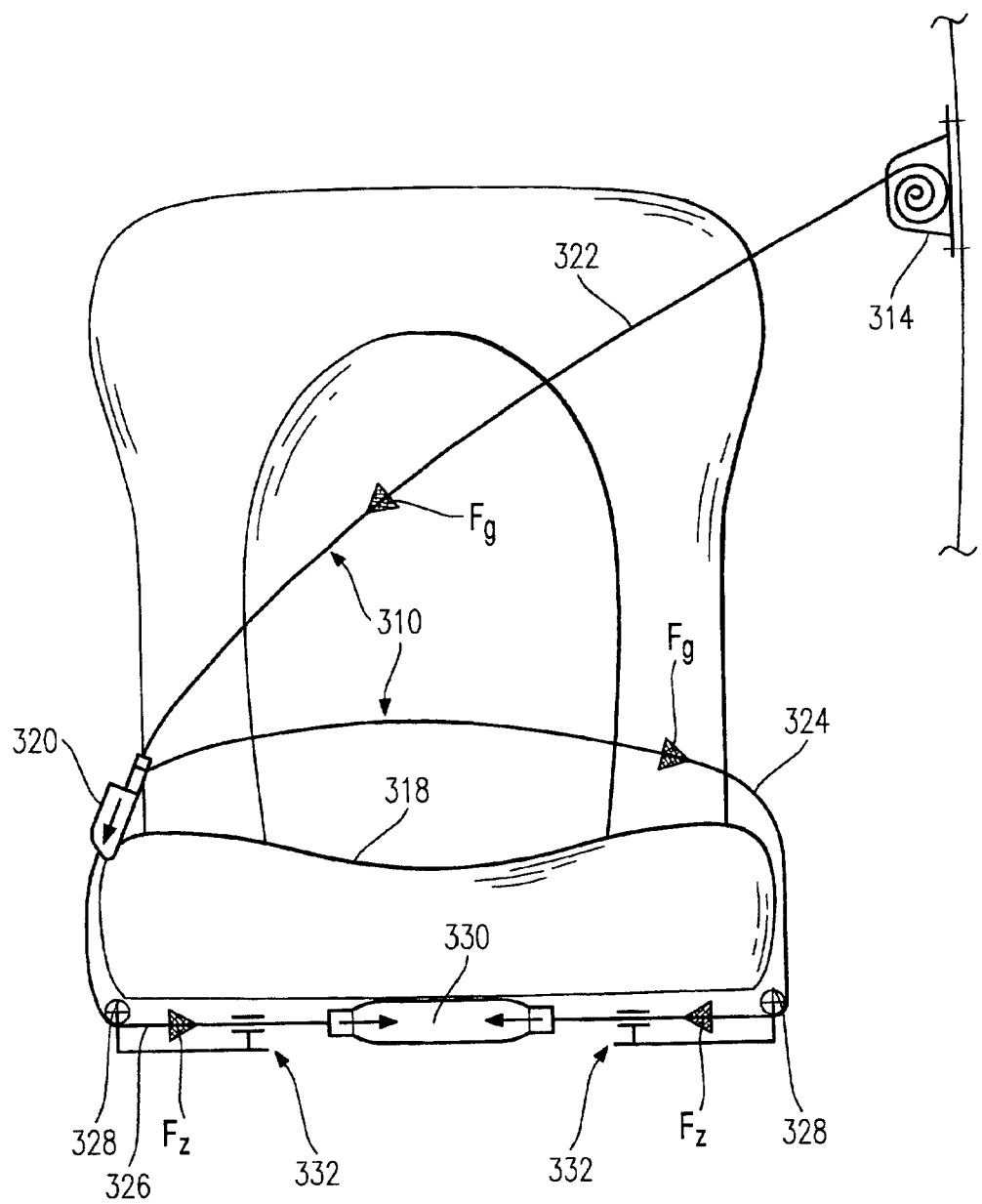
FIG. 7 shows a schematic cross-section through the assembly of FIG. 6 in the activated condition of the assembly.

Another embodiment of the invention, which is shown in FIGS. 6 and 7, relates to an assembly comprising a safety belt 310 and an actuating device 312 for tensioning the safety belt 310. The safety belt 310 is a so-called 3-point belt, i.e. in the fastened condition it is attached to three points of attachment in the vehicle, namely via a belt retractor 314 for instance to the B-pillar 315 of the vehicle frame, via an end fitting 316 on one side of a vehicle seat 318, and by means of a belt buckle 320 on the opposite side of the vehicle seat 318. Due to the point of attachment at the belt buckle 320, the safety belt 310 is divided into a shoulder belt portion 322 and a lap belt portion 324. By a traction means, for instance a wire cable 326 or a belt webbing which is guided over deflection rollers 328, the end fitting 316 and the belt buckle 320 are each connected with an actuating device 312 for tensioning the safety belt. Instead of the end fitting 316 it may also be provided to guide the end of the safety belt 310 over the deflection roller 328 to the actuating device 312. The actuating device 312 consists of a pneumatic muscle 330, which is fed by a pyrotechnical gas generator (not shown). Advantageously, the traction means below the seat is also stabilized by guideways 332, in order to avoid sagging or oscillating.

For executing a tensioning operation (FIG. 6), the actuating device 312 is activated in that the pneumatic muscle 330 is filled with compressed gas by the gas generator. The pneumatic muscle 330 thereby undergoes a longitudinal contraction and via the traction means exerts a tensile force $F_z$ both on the end fitting 316 and on the belt buckle 320. There is automatically obtained a compensation of the tensile forces $F_g$ in the safety belt 310, so that both from the lap belt portion 324 and from the shoulder belt portion 322 of the safety belt 310 a possibly existing belt slack is uniformly removed.

Alternatively, the retractor 314 and the end fitting 316 can also be connected with an actuating device via traction means, in particular when these two points of attachment are spatially disposed close to each other.

Figure 8:
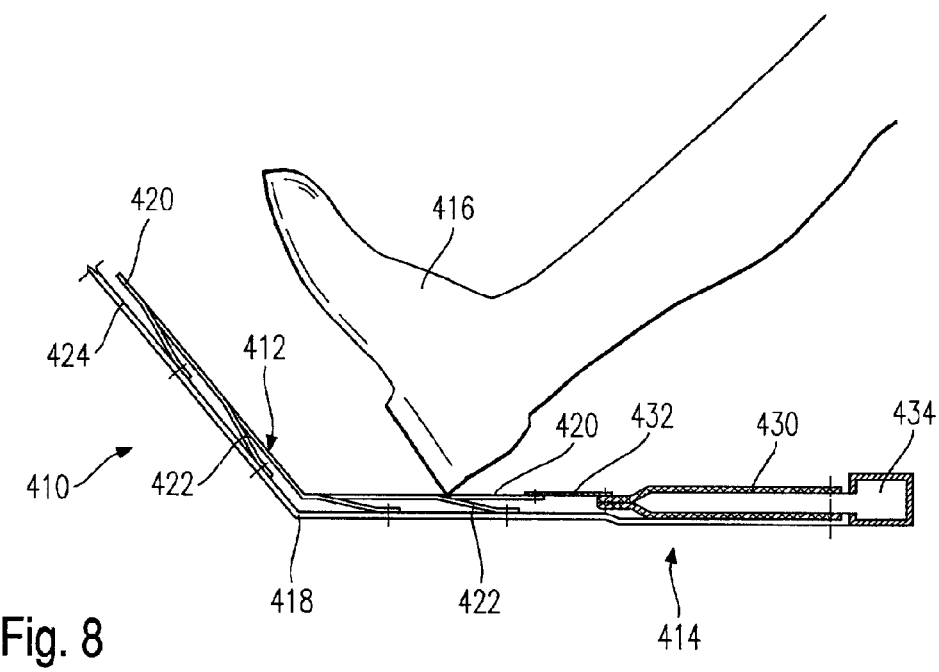
FIG. 8 shows a schematic cross-section through an assembly according to a fifth embodiment of the invention in the non-activated condition of the assembly.
Figure 9:
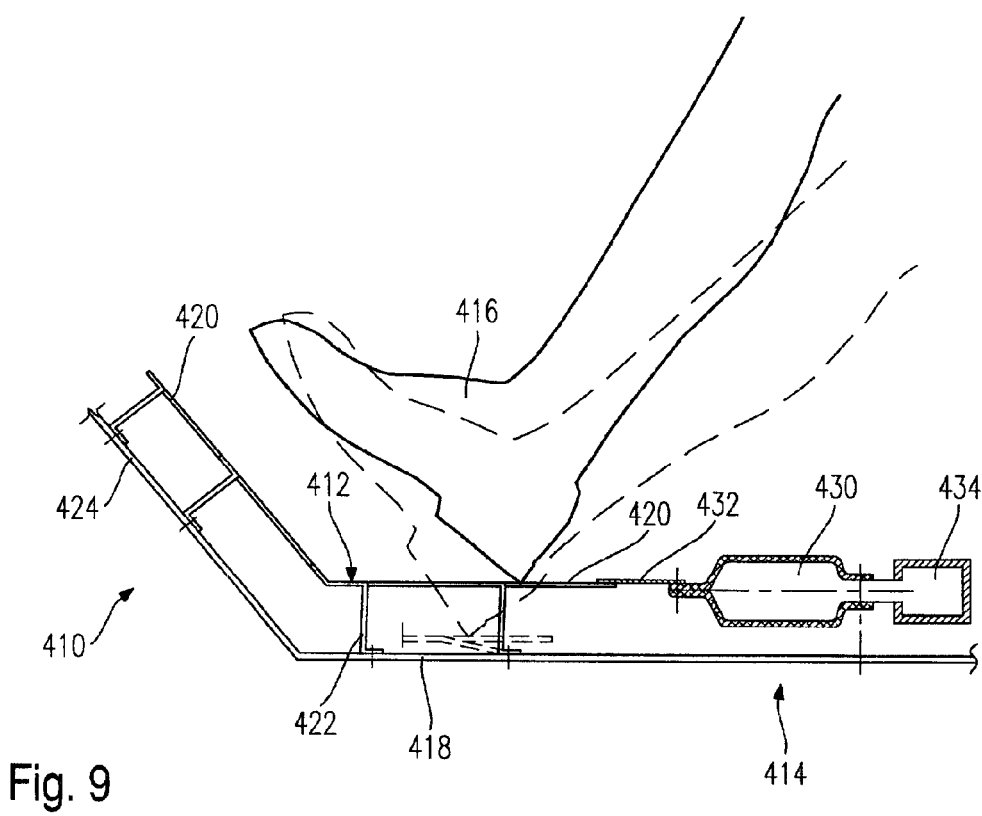
FIG. 9 shows a schematic cross-section through the assembly of FIG. 8 in the activated condition of the assembly.
Figures 10, 11:
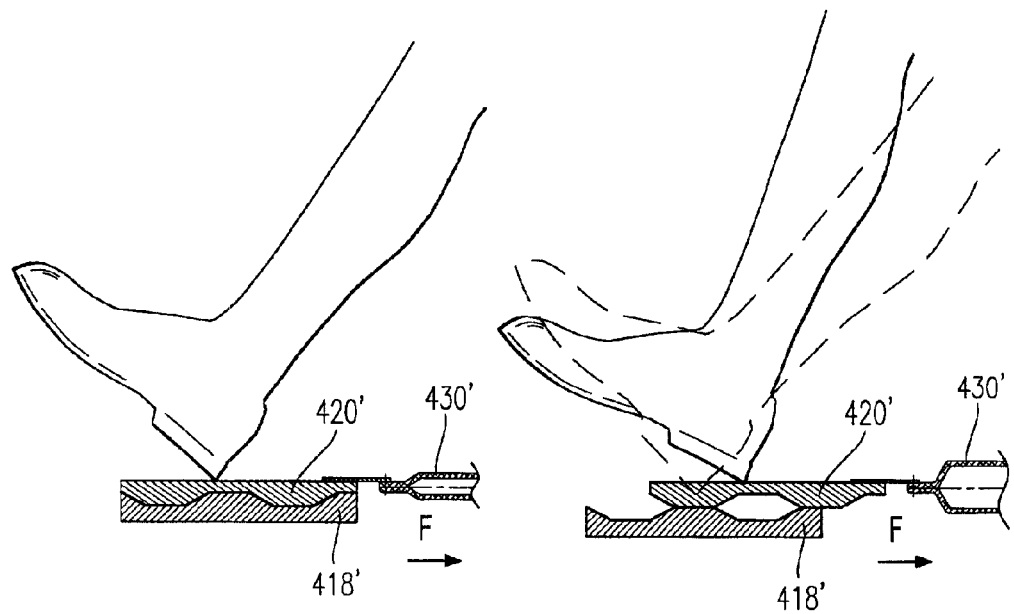
FIG. 10 shows a schematic cross-section through an assembly according to a sixth embodiment of the invention in the non-activated condition of the assembly.
FIG. 11 shows a schematic cross-section through the assembly of FIG. 10 in the activated condition of the assembly.
Figures 12, 13:
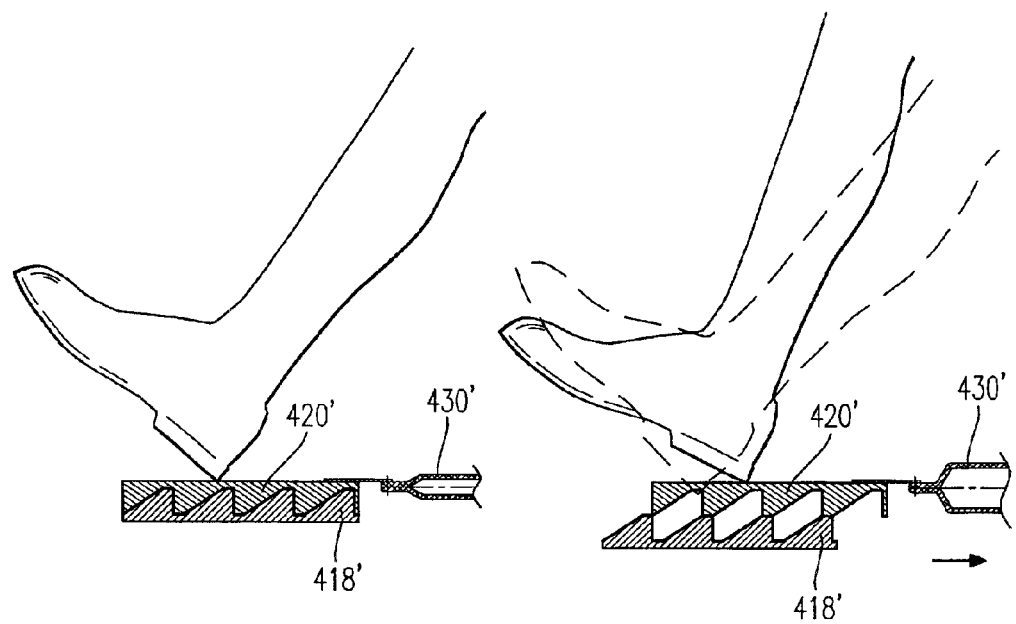
FIG. 12 shows a schematic cross-section through an assembly according to a seventh embodiment of the invention in the non-activated condition of the assembly.
FIG. 13 shows a schematic cross-section through the assembly of FIG. 12 in the activated condition of the assembly.

A still other embodiment of the invention is shown in FIGS. 8 and 9 in the form of an assembly comprising a foot protection device 410 as safety means. The foot protection device 410 is disposed in the footwell of a vehicle and comprises a foot rest 412 which is coupled with an actuating device 414. To illustrate the mode of operation of the foot protection device 410 the foot 416 of a vehicle occupant is represented schematically. The foot rest 412 consists of a double vehicle floor with a rigid outer floor portion 418 and a movable inner floor portion 420, which are connected with each other by connecting levers 422. At its forward end in direction of travel, the outer floor portion 418 is angled upwardly and verges into a splash protection wall 424. The inner floor portion rests on the side of the outer floor portion 418 pointing towards the foot 416. In the illustrated embodiment, the connecting levers 422 are punched out of the inner floor portion 420, their free ends pointing towards the actuating device 414 and being attached to the outer floor portion 418.

The actuating device 414 has a pneumatic muscle 430 and a traction lever 432, which connects a front end of the pneumatic muscle 430 with the inner floor portion 420. The rear end of the pneumatic muscle 430 is attached to the vehicle, for instance to the vehicle floor or to a frame part of the vehicle body. The pneumatic muscle 430 is in flow connection with a pyrotechnical gas generator 434, which can feed the pneumatic muscle 430 with compressed gas.

When activating the foot protection device (FIG. 9), the pyrotechnical gas generator 434 is ignited and supplies the pneumatic muscle 30 with compressed gas, whereby the same undergoes a longitudinal contraction due to an expansion of its cross-section. As a result of this longitudinal contraction, the pneumatic muscle 430 exerts a tensile force on the inner floor portion 420 via the traction lever 432, so that the inner floor portion is moved towards the actuating device 414 (in the Figures to the right). During this movement, the connecting levers 422 define the path of movement of the inner floor portion 420, whereby the inner floor portion 420 at the same time moves away from the outer floor portion 418 and thus provides a greater distance of the foot 417 of the vehicle occupant, which can rest on the inner floor portion 420, from the vehicle floor. In this way, a crumpling zone is created between the vehicle floor and the foot 416.

In FIGS. 10 to 13, there are shown two more variants of the assembly according to the invention and comprising a foot protection device. In these variants, the inner and outer floor portions constitute rigid foam plates, the contact surfaces of the two floor portions each having a mutually congruent rib structure, so that in cross-section a wave profile (FIGS. 10 and 11) and a saw-tooth profile (FIGS. 12 and 13) is obtained, respectively. The consequence is that in the case of a displacement of the inner floor portion 420' with respect to the outer floor portion 418' transverse to the longitudinal extension of the ribs the two floor portions move away from each other, and thus the supporting surface for the foot is moved away from the vehicle floor.

Figure 14:
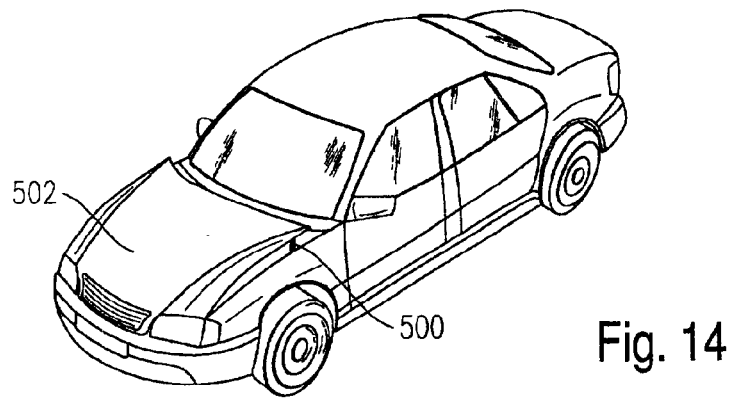
FIG. 14 shows in a schematic view a vehicle comprising an assembly according to an eighth embodiment in the activated condition.
Figures 15, 17:
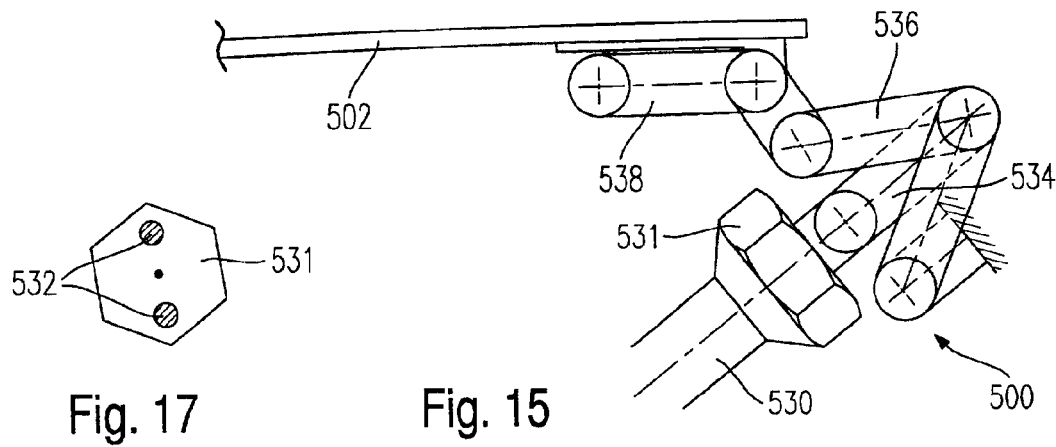
FIG. 15 shows in a schematic view the assembly according to the eighth embodiment in the non-activated condition.
FIG. 17 shows in a schematic plan view a detail of the pneumatic muscle used with the eighth embodiment.
Figure 16:
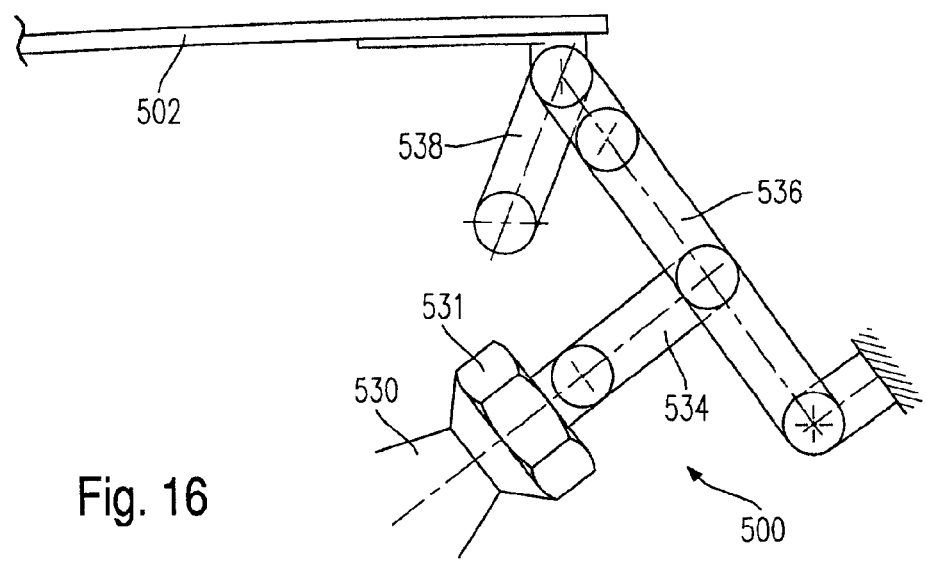
FIG. 16 shows the assembly of FIG. 15 in the activated condition.

In FIGS. 14 to 16 there is shown a seventh assembly of a safety means for a vehicle. This assembly is an actuating device 500 for an engine hood 502 of a vehicle schematically shown in FIG. 14. The actuating device comprises a pneumatic muscle 530 the end of which that is not shown is fixedly mounted to the vehicle and the other end of which is provided with a tubing head 531. Arranged in the tubing head 531 are several gas generators 532 which can be ignited in order to guide pressurized gas into the interior of the pneumatic muscle.

The tubing head 531 is connected via a tie member 534 with a knee link 536 which is articulated on one side so as to be fixed to the vehicle and on the other side to the engine hood 502. There is further provided a support member 538 on the engine hood. When the pneumatic muscle 530 shortens, the engine hood 502 is transferred through the knee link 536 from the initial position shown in FIG. 15 into the raised position shown in FIG. 16. It is in this way that a larger deformation path can be made available for the case of a collision with pedestrians or bikers. Raising the engine hood may, for example, be effected after a determination of contact in the front car region.

Raising the engine hood is to be reversible. After activation of the actuating device 500, the engine hood again can be pressed downwards so that it reaches its initial position. As there are provided several gas generators 532, of which in the case of actuation only one single is ignited, the actuation device continues to be ready for operation after an activation. It is only the gas generator that has to be replaced at the first opportunity. This is possible with small expenditure without exchanging the entire pneumatic muscle.

Figure 18:
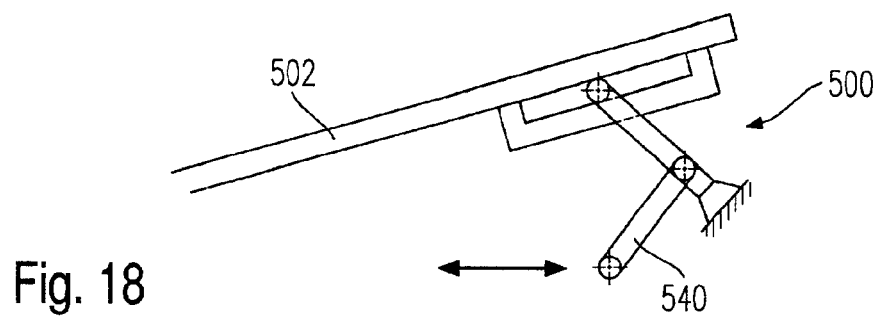
FIG. 18 shows in a schematic view a variant to the eighth embodiment.

In FIG. 18 there is schematically shown an alternative design of the actuation device 500 in which a toggle lever 540 is used that is guided on one end for sliding motion on the engine hood 502. By pivoting the toggle lever 540, the engine hood 502 can be transferred from its initial position into the raised position.

Figure 19:
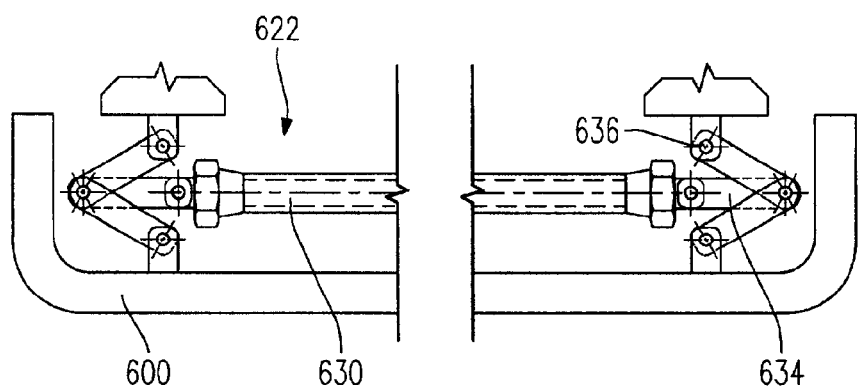
FIG. 19 shows in a schematic view an assembly according to a ninth embodiment in the non-activated condition.
Figure 20:
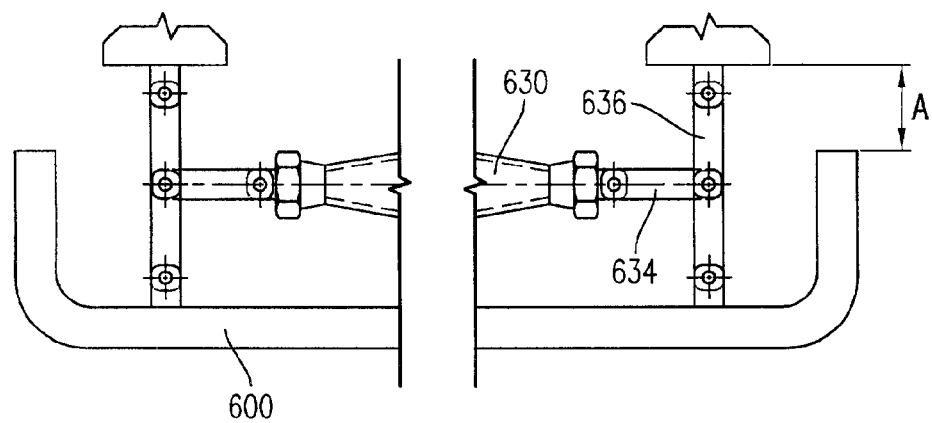
FIG. 20 shows the assembly of FIG. 19 in the activated condition.

In FIGS. 19 and 20 there is shown an eighth embodiment. This embodiment concerns a bumper 600 which can be transferred by means of an actuation device from the neutral position shown in FIG. 19 into the activated position shown in FIG. 20 in which it is extended with respect to the neutral position by a distance A. For displacing the bumper 600 there is used an actuating device 622 which employs a pneumatic muscle 630 as well as two knee links 636 as they are known from FIG. 15. Each knee link is connected on one end fixedly with the vehicle and on the other end with the bumper 600, a tie member 634 engaging at the center and being connected with the pneumatic muscle 630.

By activating the pneumatic muscle 630, the distance between the two knee links 636 lying opposite each other is shortened such that the bumper is transferred into the position shown in FIG. 20. This allows an early contact with the other party involved in the accident. The actuation device may be constructed here in such a way that it can take up an as large an amount as possible of the crash energy by it being deformed. This reduces the damage to the other structure parts of the vehicle and leads at the same time to a reduction in the vehicle impulse. If there is only a small collision, e.g. the with a post or with a vehicle at low speed, then the device may be constructed such that the energy-absorbing parts are easy to replace. This reduces the repair costs. Further, the pneumatic muscle may be designed such that due to the cooling down of the gases made available by the gas generator it automatically retracts after a slight collision into the initial position again. As an alternative, the actuation device may be designed such that the safety device is able to be forced back by the driver into the initial position again.

Figure 21:
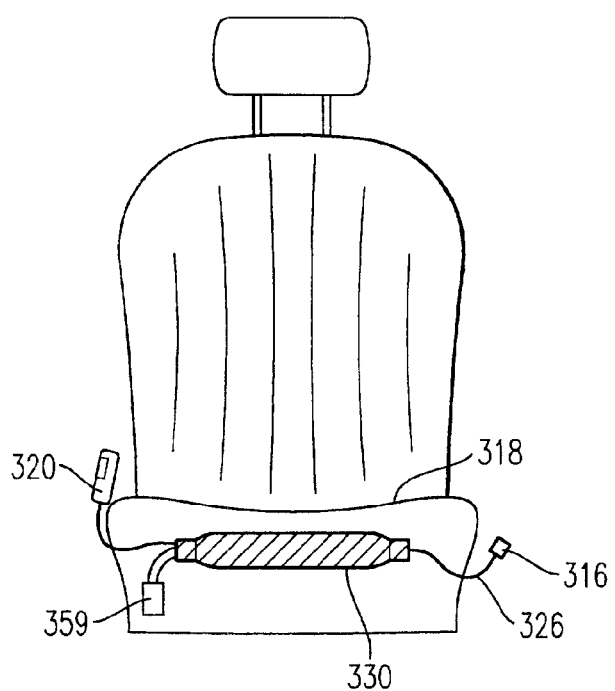
FIG. 21 shows in a schematic front view a vehicle seat comprising an assembly according to a tenth embodiment of the invention in the non-activated condition.
Figure 22:
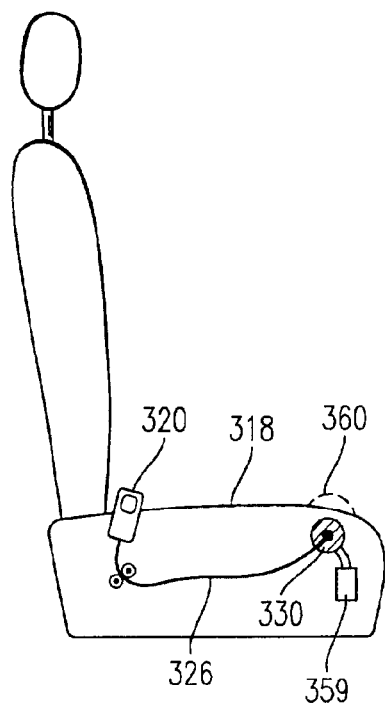
FIG. 22 shows the vehicle seat of FIG. 21 in a schematic side view.
Figure 23:
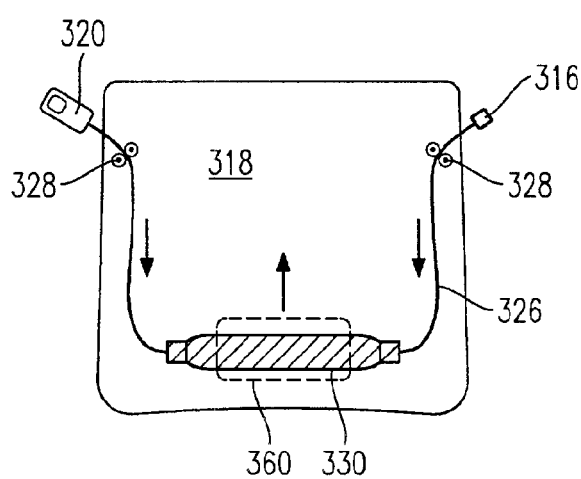
FIG. 23 shows the vehicle seat of FIG. 21 in a bottom view.

In FIGS. 21 to 23 there is shown an actuation device according to a ninth embodiment, which is based on the fourth embodiment shown in FIGS. 6 and 7. For the components known from the fourth embodiment, there are used the same reference numerals and insofar reference is made to the above explanations.

In the tenth embodiment, too, the pneumatic muscle 330 is used both for tensioning the end fitting 316 and the belt buckle 320. Provided for activation is a gas generator 359 which in case of need is activated a trigger circuit (not shown).

In contrast with the third embodiment, the pneumatic muscle is not arranged underneath the vehicle seat, but inside thereof. Further, the pneumatic muscle 330 is not arranged in the region of transition to the back rest 321, as is expedient for the shortest connection with the belt buckle and the end fitting, but nearby the front edge of the sitting surface nearby the upper side. It is in this way that a bulge 360 can be produced on the upper side of the sitting surface by means of the pneumatic muscle, when the latter is activated and is in its inflated condition. Such bulge formed by the inflated pneumatic muscle serves as an anti-submarining means. If there is provided in addition a system for the controlled ventilation of the pneumatic muscle, then it is possible to realize a belt force limiting function for the body region pelvis/lower torso.

From the above description of the invention, those skilled in the art will perceive improvements, changes and modifications. Such improvements, changes and modifications within the skill of the art are intended to be covered by the appended claims.

What is claimed is:

1. An assembly comprising a safety means and an actuating device, said actuating device comprising a drive and a pyrotechnical gas generator for, when actuated, actuating said drive, said safety means including a safety belt, which in a fastened condition is attached to at least three points of attachment in a vehicle, said drive engaging two of said points of attachment and tensioning, said safety belt in a case of restraint, said drive comprising a radially expandable, tubular body, said tubular body longitudinally contracting upon radial expansion of said tubular body to tension said safety belt.

2. The assembly according to claim 1, wherein said safety means is arranged in a region of a front, upper edge of a sitting surface of a vehicle seat.

3. The assembly according to claim 1, wherein said drive comprises a pneumatic muscle.

* * * * *